Aug. 5, 1969    D. P. COOPER, JR    3,459,111
IMAGE DISSECTION CAMERA
Filed June 20, 1966    4 Sheets-Sheet 4

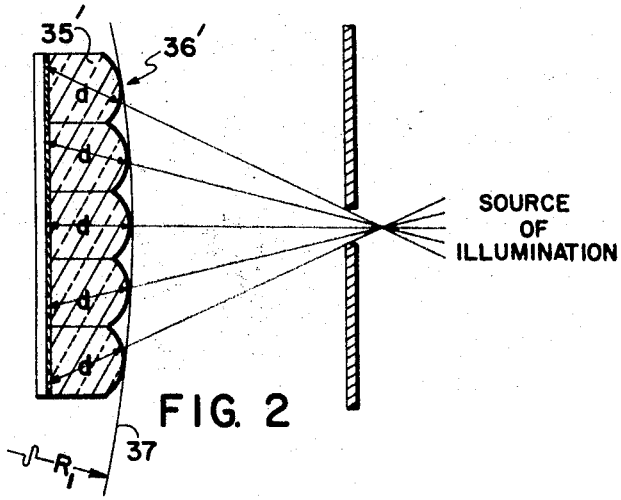
FIG. 2
FIG. 5
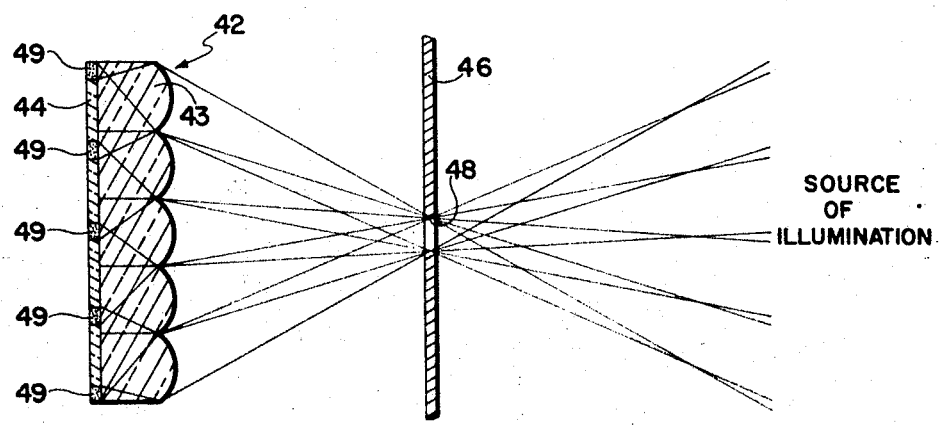
FIG. 3
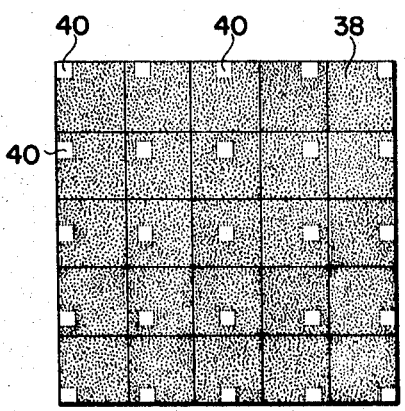
FIG. 4

INVENTORS
Dexter P. Cooper, Jr.
BY
Brown and Mikulka
and
John H. Coult
ATTORNEYS United States Patent Office
3,459,111
Patented Aug. 5, 1969

3,459,111
IMAGE DISSECTION CAMERA
Dexter P. Cooper, Jr., Lexington, Mass., assignor to Polaroid Corporation, Cambridge, Mass., a corporation of Delaware
Filed June 20, 1966, Ser. No. 558,994
Int. Cl. G03b 19/18
U.S. Cl. 95—36                                                15 Claims

ABSTRACT OF THE DISCLOSURE

An image dissection camera employing a lenticular lens plate and, in its image plane, an opaque mask having small apertures which represent the images formed by the individual lenticules of a common effective aperture located a finite distance in front of the lenticular lens plate. A photosensitive recording material is located adjacent to the image plane of the lenticular plate. Relative motion between the lenticular lens plate and the photosensitive material at an acute angle with respect to the rows of apertures allows recording a series of dissected images of the scene the camera is aimed at. A separate objective lens is not required.

---

This invention relates to cinematography, and more particularly to cinematographic apparatus for sequentially recording on a single frame of photosensitive material a plurality of composite images capable of being used to exhibit motion picture effects.

Prior art cinematographic cameras of the image dissection type have taken a number of forms. One form includes a field lens focusing an image of the photographic subject or scene upon photosensitive material in the image plane of the field lens. A scanning member adjacent the focal plane has a large number of minute apertures therein for dissecting the image. Exposure of the photosensitive materials through the scanning member yields a composite image of the subject which consists of a large number of spaced components thereof. Successive composite images of the subject are recorded progressively upon the unexposed portions of the photosensitive materials by moving the scanning member across the material.

Other devices utilize a lenticular surface adjacent the photosensitive material for dissecting the image of a scanning aperture focused by a field lens on the lenticular member. With such devices, as the effective aperture of the field lens is scanned by the scanning aperture, sequential images of a portion of the scene are recorded behind each lenticule. Thus, a timed sequence of composite images of the subject is recorded.

In devices of the above-described type a field lens is required to image the subject upon the photosensitive material. This invention contemplates the provision of cinematographic apparatus of the image dissection-type employing a lenticulated image-dissecting member, but which, in a preferred form, is effective to produce a cinematographic record of successive composite images of the subject without the use of a field or objective lens.

It is important in image dissection cameras that the components of the composite image may be formed by the image dissecting means in the camera be free from scattered or stray light, as might be caused by adjacent or remote lenticules.

Accordingly, it is an object of this invention to provide cinematographic apparatus of the image dissection-type including means for masking the photosensitive material to exclude scattered light from the composite image formed by the apparatus.

It is another object of this invention to provide a cinematographic camera of the image dissection type which is relatively compact.

It is a further object of this invention to provide cinematographic apparatus for sequentially recording on sensitive material, a plurality of composite images capable of being used to exhibit motion picture effects, which apparatus includes a lenticular plate, an apertured mask adjacent the image plane of the lenticules comprising the lenticular plate, and means for effecting relative movement between photosensitive material supported in said image plane and the apertured mask on a path effective to progressively expose through said apertures the unexposed area on said material to record a timed sequence of composite exposures of the photographic subject.

It is yet another object of this invention to provide a novel optical system for forming a dissected image of a photographic subject which comprises a lenticular plate and a mask adjacent the image plane of the lenticules comprising the plate and on the subject side thereof, which mask has a plurality of apertures therein arranged to represent the images formed by the lenticules of a common effective aperture located a predetermined distance on the subject side of the plate.

Very briefly, one implementation of the inventive concept may take the form of a camera mounting a lenticular plate having a large number of minute lenses, or lenticules, arranged in a regular array, for example, along mutually perpendicular lines. The lenticules are focused upon a common image plane. An opaque apertured mask is disposed between the lenticular plate and a frame of photosensitive material. The mask has an array of minute spaced apertures therein, one aperture being located at the image area behind each lenticule and in a relative position on said area different from the position of every other aperture on the image area behind its respective lenticule. With the apertures thus located the image components admitted through each of said apertures to said image plane represent different portions of the photographic subject. In a preferred embodiment, the apertures in the mask may be located such that each aperture represents the image formed by its respectively associated lenticule of a common effective aperture located a predetermined distance on the subject side of the lenticular plate.

The camera also includes means for effecting relative movement between the photosensitive material and the apertured mask in the image plane of the lenticules. The relative movement would be accomplished on a path effective to progressively expose the unexposed area on the photosensitive material to record a timed sequence of composite images of the photographic subject.

In another embodiment, the camera may be adapted to include a field lens focused on the lenticular plate, the field lens serving, in effect, to alter the field angle of each of the lenticules on the lenticular plate.

Other objects of this invention will in part be obvious and will in part appear hereinafter. The invention, accordingly, comprises the apparatus possessing the construction, combination of elements and arrangement of parts which are exemplified in the following detailed disclosure, and the scope of the application of which are indicated in the claims. For a fuller understanding of the nature and objects of the invention, reference should be had to the following description taken in connection with the accompanying drawings wherein:

FIGURE 1 schematically illustrates one embodiment of the invention in a cinematographic camera which requires no field lens, a ray diagram being included to graphically depict the optical effect of each of the lenticules of the lenticular plate;

FIG. 2 shows an alternative embodiment of the lenticular plate illustrated in FIGURE 1;

FIG. 3 schematically illustrates apparatus by which the apertured mask may be formed by a photographic technique;

FIG. 4 portrays a mask formed by the apparatus shown in FIG. 3;

FIG. 5 represents a photographic subject divided into designated sections;

This invention concerns cinematographic apparatus of the image dissection type wherein a plurality of composite images of a photographic subject are recorded sequentially on a single frame of photosensitive material. The cinematographic record so produced is capable of being used to exhibit motion-picture effects when viewed with or through appropriate viewing or projection apparatus.

Figure 1:
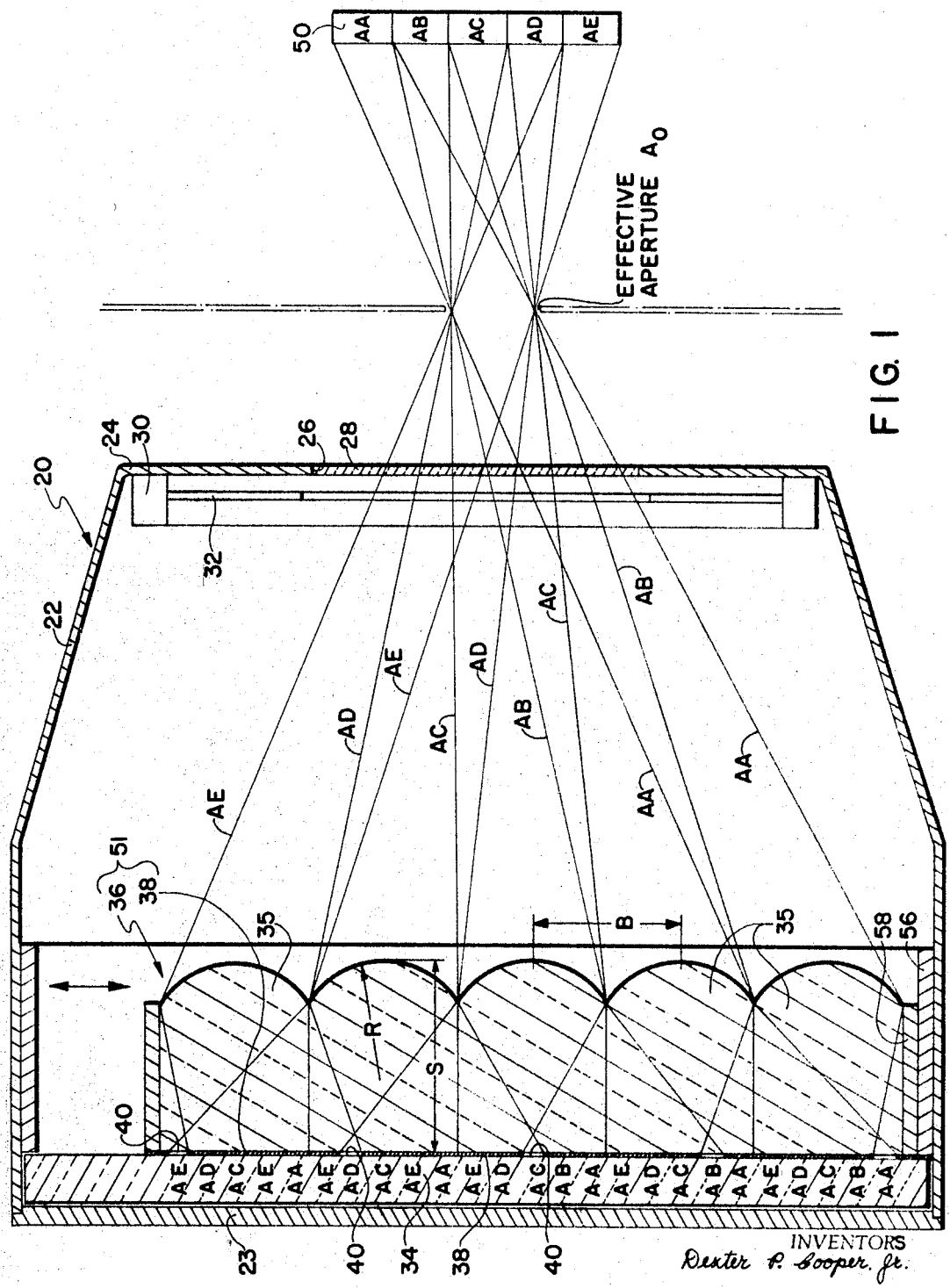

FIGURE 1 of the drawings schematically illustrates one of the many structures which may be constructed according to the teachings of the invention. The invention is illustrated as being embodied in an image dissection camera 20 having a housing 22 and a back 23. The housing has a forward wall 24 having an open 26 therein. A transparent window 28 closes the opening 26. The camera 20 includes a capping shutter 30 having a shutter blade means 32.

A photosensitive emulsion 34 having a backing is supported in the common image plane of the minute lenses, or lenticules 35, constituting a lenticular plate 36. The lenticular plate 36 may be formed, as by molding, from a synthetic transparent material such as polymethyl methacrylate having an index of refraction of 1.49. It should be understood, of course, that FIGURE 1 and the other figures of the drawings are not drawn to scale and that elements represented in the drawings are grossly distorted out of scale for clarity of illustration. A lenticular plate constructed in accordance with the present invention would contain thousands of coplanar, identical lenticules focused on a common image plane. The lenticular plate 36 illustrated schematically in the drawings illustrates only a small number of lenticules 35 representative of the whole. To assist in understanding the invention, it may be helpful to note the following relative dimensions on an exemplary lenticular plate: the spacing or pitch B of the lenticules and the radius R of the spherical surface of each lenticule may equal twenty-five thousandths of an inch; the thickness $s$ of the lenticular plate may equal seventy-five thousandths of an inch.

Alternatively, the lenticular plate 36 may be formed, as shown in FIG. 2 at 36, with the apices of the lenticules 35′ lying on an imaginary spherical surface, shown exaggerated at 37. From the ray diagram in FIG. 2, it is evident that with such an arrangement, assuming a properly selected radius of curvature $R_1$ for the imaginary spherical surface 41, the focal distance $d$ between the common image plane of the lenticules 35′ and the point wherein each ray enters a lenticule 35′ is equal for all lenticules.

In order to obviate the need for a field lens and a scanning aperture structure associated therewith, and in order to restrict and precisely define the effective field of view of each lenticule 35, a mask 38 is provided. The mask 38 is preferably very thin and is disposed on the planar rear surface of the lenticular plate 36 or in some way affixed with respect thereto so as to assure no relative movement between the lenticular plate 36 and the mask 38. The mask 38 is formed so as to have thousands of minute apertures 40 therein, one aperture for each lenticule 35. Each of the apertures 40 is disposed in a relative position on the image area behind its respectively associated lenticule 35, which is different from the position of every other aperture on the image area behind its respectively associated lenticule.

Each lenticule 35 will image the photographic subject on its image area. Because of the mutually exclusive relative location of each of the apertures 40 on the respective lenticule image areas, the image components admitted through the apertures 40 to the image plane represent different portions of the photographic subject. Thus, considering the lenticular plate 36 and the photosensitive emulsion 34 as a whole, it is evident that a composite image of the photographic subject will be recorded on the emulsion 34 through the aperture 40 in the mask 38 when the emulsion 34 is exposed to the subject.

A preferred form of the mask 38 has been constructed using photographic techniques. In FIG. 3 apparatus is shown schematically for photographically forming a mask 38. The apparatus for forming the mask 38 comprises, essentially, a lenticular plate 42 identical to the lenticular plate 36 used in the above-described camera, a photosensitive emulsion 44 disposed in contact with the rearmost surface of the lenticular plate 42 and a light-tight housing 46. The housing 46 has an opening 48 therein which is uniformly illuminated from a source of illumination. By way of example, exposure of the emulsion 44 through an opening 48 one tenth of an inch wide and located five inches from the lenticular plate 42 results in the formation of an image 49 on the emulsion 44 of the opening 48 behind each lenticule on plate 42 having an effective width in the order of one thousandth of an inch. The opening 48 is imaged by each lenticule on its image area in a relative position different from the position of the image of the opening 48 on the image area behind every other lenticule. Assuming the opening 48 to be square for clarity of illustration, by well known optical principles the emulsion 44 records the images 49 of the opening 48 in the relationship illustrated by the lightened areas in FIG. 4. Using conventional contact printing or image reversal techniques, an apertured mask 38 may be formed from the record on the emulsion 44 having light-transmissible areas corresponding to the areas on the emulsion 44 which were exposed. Thus, FIG. 4 represents a mask 38 formed by the above-described photographic technique.

Alternatively, the mask 38 may be formed photographically without the need for an image reversal step if a black spot on a uniformly illuminated surround were photographed, rather than a uniformly illuminated opening on a dark surround. While this latter technique would be direct, the former technique is favored because of its comparative simplicity.

It should be noted that a mask 38 formed by the photographic technique described above has the apertures 40 therein arrayed along mutually perpendicular lines as are the lenticules 35 on the lenticular plate 36. Note, however, that the spacing or pitch of the lines of apertures 40 is greater than the pitch of the lines of lenticules 35. This fact of pitch difference is important, as will become evident below in connection with the description of the apparatus and method for progressively exposing the photosensitive emulsion 34.

Referring to the FIGURE 1 embodiment, it should be understood that with a mask 38 formed as described above having apertures 40 located to represent the images of opening 48, the apertures 40 function to define a projected effective aperture $Ao$ of the size and at the location of the opening 48 during the mask-forming operation. Each lenticule 35 and the respectively associated mask aperture 40 can be analogized to a narrow field angle camera for which the lenticule acts as the objective and the projected effective aperture $Ao$, as defined by the mask aperture 40, serves to define the effective aperture therefor. Because of the short focal length of the lenticules and the narrow field angle, each lenticule has a depth of field sufficiently great to include the effective aperture Ao and everything beyond, including the scene being photographed. Thus, focusing apparatus is unnecessary.

A photographic subject 50 as shown in FIG. 5 will be assumed throughout the remainder of this specification. It will be seen by referring to the ray diagram in FIGURE 1 that a different portion of the photographic subject 50 will be recorded behind each aperture. Tracing light rays AA from portion AA of the photographic subject 50, it will be seen that this portion of the subject 50 will be imaged on the emulsion 34 through the mask aperture which is disposed behind the lowermost lenticule on the lenticular plate 36. The images of portions AB, AC, AD, and AE of the subject 50 are not transmitted to that area of the emulsion 34 which is coextensive with the image area of the lowermost lenticule, but are blocked therefrom by the mask 38. As indicated by the ray diagram each of the other portions of the subject 50, AB, AC, AD, and AE are imaged on the emulsion through the aperture associated with only one lenticule. Thus, a composite image of the subject 50 is formed on the photosensitive emulsion, as represented by the solid letters in the diagram.

In order that a large number of composite images of the photographic subject may be recorded in a timed sequence upon a single frame of emulsion 34, means are provided for effecting relative movement between the emulsion 34 and the apertured mask 38. To effect this relative movement, either the lenticular plate-mask unit, hereinafter designated 51, may be fixed and the emulsion 34 moved or, preferably, the emulsion 34 may be fixed and the plate-mask unit 51 moved to progressively expose the unexposed areas on the emulsion 34. In either arrangement, it is preferable that the rectangular array of the plate-mask 51 be skewed at an angle with respect to the direction of relative movement between the unit 51 and the emulsion 34.

Figure 6:
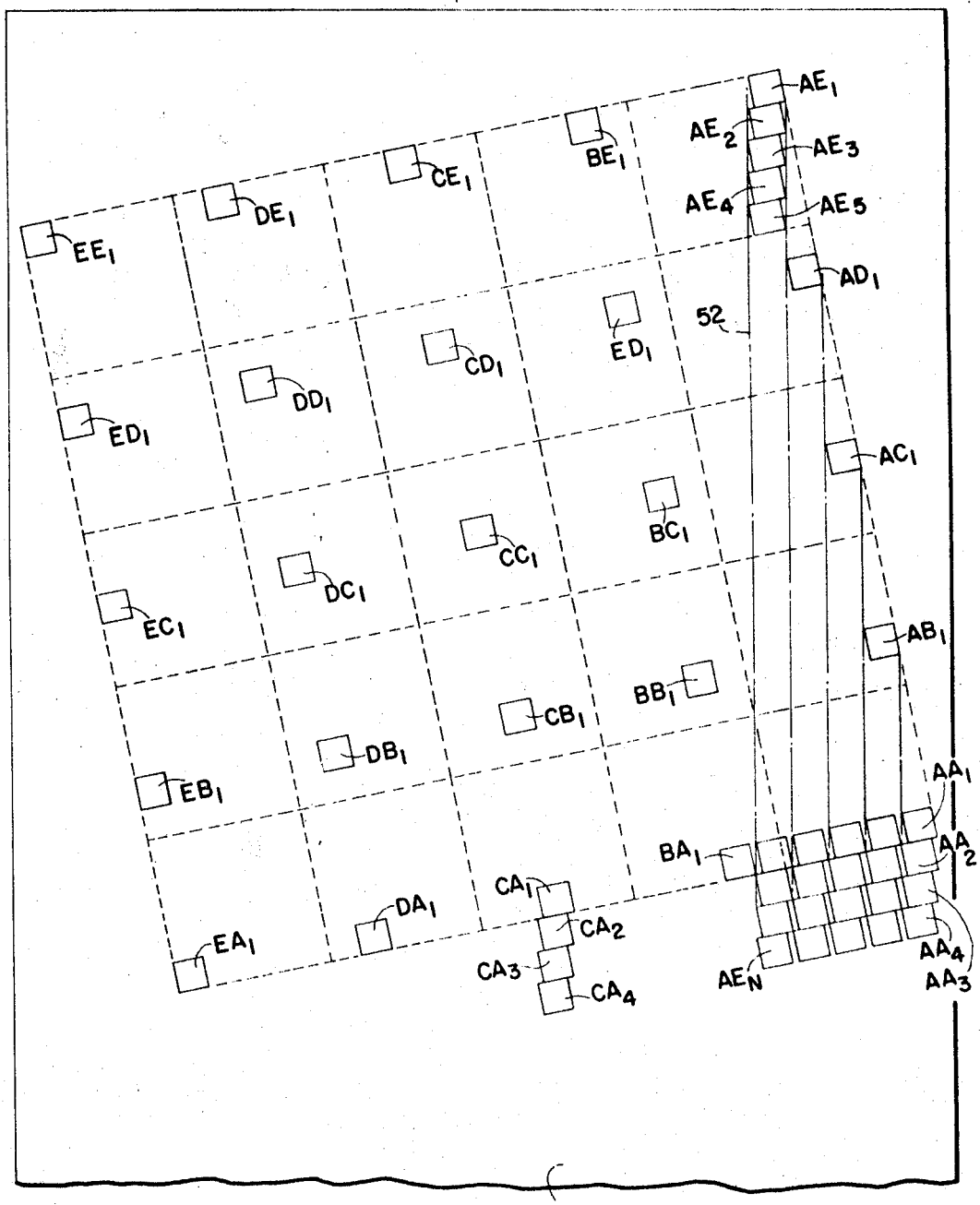
FIG. 6 illustrates a manner in which the photosensitive material may be progressively exposed by a succession of composite images of the photographic subject illustrated in FIG. 5.

In an arrangement wherein the lenticular plate-mask unit 51 is skewed and fixed and the emulsion 34 is moved, a composite image of subject 50 formed by the lenticular plate 36 through the mask 38 appears on the emulsion 34 as shown in FIG. 6. With such an arrangement, a large number of composite exposures of the subject can be made before a double exposure results, that is before a line of images formed by one line of lenticules merges with or intersects an adjacent line of images formed by an adjacent line of lenticules.

Referring to FIG. 6, as the emulsion 34 is moved, the image component AE representing the image of the portion AE of the photographic subject 50 forms a trace 52 of successive exposures as indicated by the image components $AE_1$, $AE_2$, $AE_3$, $AE_4$, $AE_5$, and so forth. It is evident that with the lenticular plate-mask unit skewed to form images as illustrated, a great many more composite exposures of the photographic subject can be taken than would be possible without the skewing technique. In FIG. 6, for the sake of clarity of illustration, the composite image is shown as being skewed at an angle whose tangent approximates two tenths. In practice, with a plate-mask unit 51 dimensioned as described above, it has been found to be satisfactory to skew the image at an angle whose tangent approximates one tenth. In other words, the trace 52 of successive exposures covers ten times the pitch of the apertures 40 in the direction of relative movement before the trace 52 moves transversely a distance equal to the pitch of the apertures 40. In FIG. 6 traces that are produced by the light transmitted through randomly selected apertures are shown; however, it should be understood that in practice a trace is produced through each aperture 40 in the mask 38, and thus a number of parallel traces equal to the number of apertures 40 in the mask 38 is produced. The area covered by these traces collectively is approximately coextensive with the exposable emulsion area. If, for example, the pitch of the apertures 40 in the mask 38 is approximately twenty-six thousandths of an inch, then the emulsion 34 moves twenty-six hundredths of an inch in order to effect an exposure of substantially all of the emulsion suface.

As an alternative to moving the emulsion 34, the emulsion 34 may be fixed and the lenticular plate-mask unit 51 moved relative thereto to accomplish a progressive exposure of the emulsion 34. Transport apparatus which might be used for moving the lenticular plate-mask unit 51 is illustrated schematically in FIGS. 7 and 1 at 54. The apparatus 54 comprises a rectangular frame 56 serving as external guide and support means for a smaller rectangular carriage 58, mounting the plate-mask unit 51. Motive means 60 having a controllable output speed drives a screw 62. The motive means 60 may be an electric motor or a spring motor having speed control means. The carriage 58 has a groove 64 therein which receives a tongue 66 extending from a driven member 68 driven off the screw 62.

Figure 7:
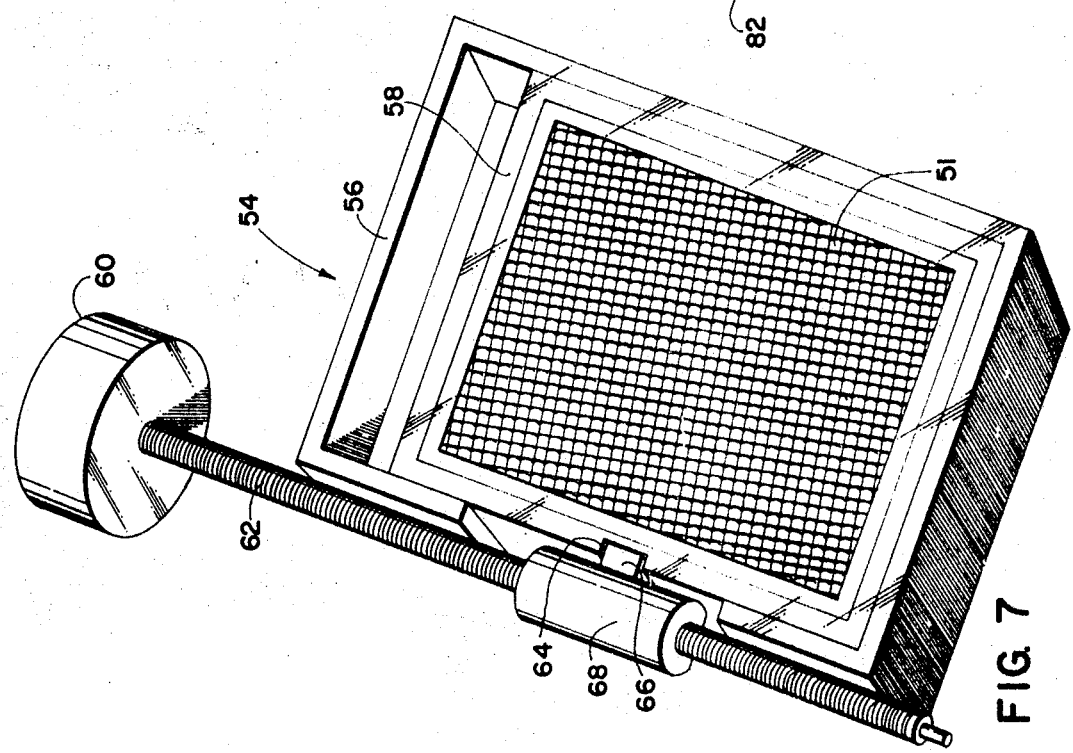
FIG. 7 illustrates schematically transport means for transporting the lenticular plate across the photosensitive material.

The exposure of the photosensitive emulsion 34 with the transport appaartus 54 illustrated in FIGS. 1 and 7 is as described in FIG. 6 with the following exception. With an embodiment wherein the emulsion 34 is moved and the lenticular plate-mask unit 51 is fixed, the composite image component recorded through each aperture 40 in the mask 38 always represents a fixed or given portion of the photographic subject. However, if the emulsion 34 is fixed and the unit 51 is moved, the portion of the photographic subject imaged by each lenticule 35 through its respectively associated aperture 40 does not remain constant but shifts as the unit 51 is moved.

At the upper limit of the locus of travel of the carriage 58 at the end of an exposure interval, the portion of the photographic subject imaged by the uppermost lenticule on the lenticular plate 36 is not quite the same portion as is imaged at the beginning of the interval wherein the carriage 58 is disposed at the other extreme of its locus of travel. However, because the shift in the portion of the photographic subject imaged by each lenticule is so slow, and because the total displacement of the lenticular plate 36 is so limited (approximately twenty-five hundredths of an inch, for example) the effect of the image shaft caused by moving the lenticular plate 36 is not of major significance for most photographic situations.

Briefly, using transport apparatus 54, as shown in FIG. 7, the operation of the camera 20 is as follows: At the initiation of an exposure interval, the capping shutter 30 is opened and the transport apparatus 54 is energized. As the lenticular plate-mask unit 51 is carried (upward in the FIGURE 1 configuration) across the photosensitive emulsion 34, the emulsion 34 is progressively exposed by a succession of composite images of the photographic subject. The forward wall 24 of the camera housing 22 acts as a shield to prevent the formation of secondary images through the mask apertures 40 by lenticules adjacent the respectively associated lenticules. At the termination of the exposure interval, the capping shutter 30 is closed, either manually if the entire emulsion 34 has not been exposed, or automatically if the emulsion has been fully exposed. The manual or automatic means for terminating the exposure interval are within the capabilities of those skilled in the art and have been omitted for the sake of simplicity and clarity of description.

Consistent with the exemplary relative dimensions indicated above, assume that a lenticular plate 36 is used which has forty lenticules per inch (twenty-five thousandths of an inch pitch) and that the width of each of the mask apertures 40 is one thousandth of an inch. Assume also that the plate 36 is skewed at an angle whose tangent approximates one tenth. For an effective exposure time of each image component of one tenth of a second, satisfactory results are obtained when the lenticular plate-mask unit 51 is moved by the transport apparatus 54 at a rate of ten thousandths of an inch per second. A maximum exposure interval of twent-five seconds is obtained. If an effective exposure time of each image component of one twenty-fifth of a second is desired, then a transport rate of twenty-five thousandths of an inch per second yields a maximum exposure interval of ten seconds. The maximum exposure interval may be increased or the effective exposure speed may be decreased if the size of the mask apertures 40 is reduced.

It is evident then that by this invention cinematographic apparatus has been provided for sequentially recording on a single frame of photosensitive material a plurality of composite images of a photographic subject capable of being used to exhibit motion picture effects. The illustrated embodiment requires no field lens, making possible cameras having great axial compactness. Attendant thereto is the advantage that since no field lens is required, no focusing structure of focusing operation is required. The lenticule comprising the lenticular plate 36 and the apertured mask 38 defining the effective aperture produce a very large depth of field.

Figure 8:
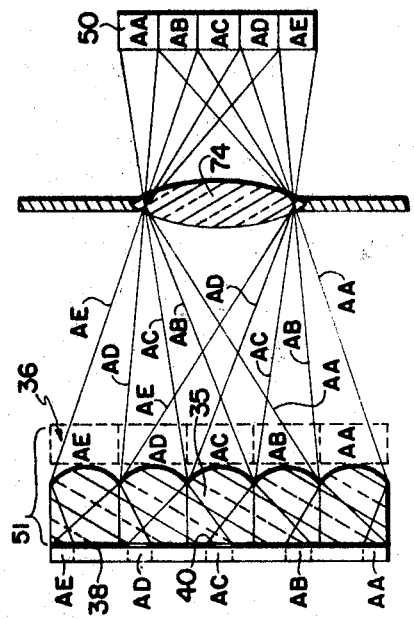
FIG. 8 is a schematic representation of another embodiment of the invention in a camera utilizing a field lens, a ray diagram being included to show the optical effect of the field lens and the lenticules on the lenticular plate.

FIG. 8 represents a modified form of the camera described above employing a field lens. The lenticular plate-mask unit 51 and the transport means 64 for effecting relative movement between the unit 51 and the emulsion 34 may be identical with the corresponding structure on the above-described embodiment requiring no field lens. A field lens 74 functions to focus the photographic subject across the lenticular surface of the lenticular plate 36, as shown in phantom lines in FIG. 8. Each of the lenticules 35 comprising the lenticular plate 36 acts to integrate the light impinging upon its surface. Light collected by each lenticule 35 is transmitted through the aperture 40 in the mask 38 associated with that lenticule. The ray diagram illustrates the portions of the photographic subject 50 which will be imaged behind each lenticule through the aperture associated therewith. Rays AA representing light from portion AA of the photographic subject 50 carry brightness information which is recorded behind the lowermost lenticule through the aperture in the mask 38 which is associated with that lenticule. Likewise, light from the other portions of the subject 50, AB, AC, AD and AE, is integrated and brightness information is recorded upon the emulsion 34 corresponding to the portion of the photographic subject from which each lenticule collects light. Thus a composite image of the photographic subject is recorded upon the emulsion 34 through the mask apertures 40. The fields lens 74 has the effect of altering the field angle of each of the lenticules on the plate 36.

Figure 9:
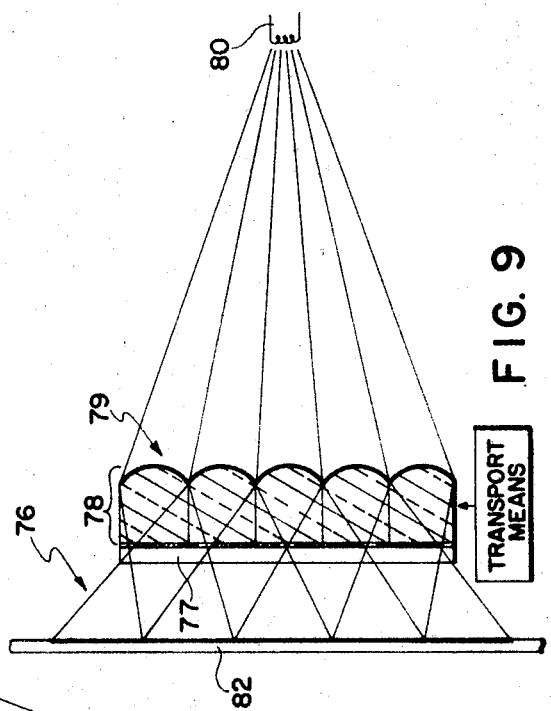
FIG. 9 illustrates schematically apparatus by which the cinematographic record produced by a camera embodying the invention can be viewed.

Numerous methods and apparatus may be devised for viewing or projecting the developed cinematographic record produced by the above-described apparatus. Suitable apparatus 76 for viewing the cinematographic record 77 is illustrated schematically in FIG. 9. This viewing apparatus 76 comprises a lenticular plate-mask unit 78 which may be the same plate-mask unit as was used in producing the cinematographic record 77. A light source 80 located on the subject side of the unit 78 illuminates the lenticular surface of the lenticular plate 79 constituting part of the unit. 78. A ground glass screen 82 or other suitable viewing screen is located behind the image plane of the lenticules comprising the lenticular plate 78 a distance equal to the distance from the apices of the lenticules to the image plane. Transport means 84 for transporting the lenticular plate-mask unit 78 (or, alternatively, the record 77 if the photosensitive emulsion 34 was transported during the taking operation) may be the same transport apparatus 54 that was utilized to move the unit 51 during the taking operation.

To obtain motion picture effects utilizing the illustrated viewing apparatus 76, a capping shutter (not shown) is opened and the unit 78 is transported by the transport means 84 along the image plane of the lenticules constituting the lenticular plate 79 at the same speed as was used in the taking operation. Referring to the day diagram in FIG. 9, as the unit 78 is transported across the record 77, the light from the light source 80 will project the brightness information stored in the cinematographic record 77 upon the screen 82. Thus, the successively formed composite images of the photographic subject are viewed in the proper sequence upon the screen 82. Any motion which may have been present in the photographic subject during the taking operation will be exhibited on the screen 82 during the viewing operation.

Structural implementations other than those described above are within the purview of this invention. For example, the transport means has been described above as effecting a continuous movement of the lenticular plate-mask unit (or film material). Alternatively, transport means may be devised to effect an intermittent relative movement between the unit and the film material during the relative movement interval. If such an intermittent transport were employed during the taking operation, then, of course, the same transport means would necessarily be utilized during the viewing or projecting operation. An arrangement may be provided wherein the lenticular plate-mask unit has the lenticules and associated mask apertures arranged in a spiral array rather than on mutually perpendicular lines. In such an embodiment the relative movement between the unit and the film material is necessarily angular.

Since certain changes may be made in the above apparatus without departing from the scope of the invention involved, it is intended that all matter contained in the above description or shown in the accompanying drawings shall be interpreted as illustrative and not in a limiting sense.

What is claimed is:

1. An image dissection camera for obtaining photographic exposures exhibiting motion-picture effects comprising:

a lenticulated lens plate having a regular array of minute lenses for focusing at a common image plane discrete images of a common photogarphic subject;
   an opaque shield adjacent said image plane with a pattern of minute apertures therein, one for each of said lenses, each of said apertures representing the image, formed by its respectively associated lens, of a common effective aperture located a finite distance on the subject side of said lens plate, the pitch of said apertures being greater than the pitch of their respectively associated lenses, whereby the image components admitted through said apertures to said image plane constitute different image portions of said photograpic subject; and
   means for supporting at said image plane a photosensitive material capable of receiving photographic images and for effecting relative movement between said plate and said shield as a unit and said material in a plane parallel to said image plane in regular progression to record a timed sequence of photographic exposures of said photographic subject.

2. Cinematographic apparatus for sequentially recording on photosensitive material a plurality of composite images of a photographic subject capable of being used to exhibit motion picture effects, including:

a lenticular plate comprising a regular array of lenticules for imaging a photographic subject at a common image plane;
   opaque shield means adjacent said image plane on the subject side thereof and fixed with respect to said lenticular plate, said means having a pattern of minute apertures therein, one for each of said lenticules, each of said apertures representing the image formed by its respectively associated lenticule of a common effective aperture located a finite distance on the subject side of said plate, the pitch of said apertures being greater than the pitch of their respecively associated lenticules, whereby the image components admitted through said apertures to said image plane represent different portions of said photographic subject;

means for supporting a photosentive material at said image plane; and means for effecting relative movement between the photosensitive material and the shield means in said image plane on a path effective to progressively expose through said apertures the unexposed area on said material to record a timed sequence of composite exposures of the photograpsic subject.

3. The apparatus defined by claim 2 wherein said lenticules on said lenticular plate and said apertures in said shield means are arranged in grid-like arrays on mutually perpendicular lines of predetermined pitch, the pitch of said array of apertures being greater than the pitch of said array of lenticules.

4. The apparatus defined by claim 3 wherein said relative movement between the photosensitive material and said shield means is linear at an acute angle with respect to one set of parallel lines of apertures.

5. Cinematographic apparatus for sequentially recording on photosensitive material a plurality of composite images of a photographic subject capable of being used to exhibit motion picture effects, including:

(a) a lenticular plate having an array of lenticules for focusing at a common image plane discrete images of a common photographic subject;

(b) opaque shield means adjacent said image plane and fixed with respect to said lenticular plate, said means having a pattern of minute spaced apertures therein, one aperture being located on the image area behind each lenticule and in a relative position on said area different from the position of every other aperture on the image area behind its respective lenticule, whereby the image components admitted through each of said apertures to said image plane represent different portions of said photographic subject;

(c) means for supporting a photosensitive material at said image plane; and (d) means for effecting relative movement between the photosensitive material and said shield means in said image plane on a path effective to progressively expose through said apertures the unexposed area on said material to record a timed sequence of composite exposures of the photographic subject.

6. The apparatus defined by claim 5 including light blocking means for limiting the light transmitted through each of said apertures in said shield means to that collected by its respectively associated lenticule.

7. The apparatus defined by claim 5 wherein said lenticules on said lenticular plate and said apertures in said shield means are arranged in grid-like arrays on mutually perpendicular lines of predetermined pitch, the pitch of said array of apertures being greater than the pitch of said array of lenticules.

8. The apparatus defined by claim 7 wherein each of said apertures in said shield means represents the image formed by its respectively associated lenticule of a common effective aperture located a predetermined distance on the subject side of said lenticular plate.

9. The apparatus defined by claim 7 wherein said relative movement between the photosensitive material and said shield means is recitlinear at an acute angle with respect to one set of parallel lines of apertures.

10. The apparatus defined by claim 9 wherein said means for effecting relative movement between the photosensitive material and said shield means include a carriage carrying said lenticular plate and means for moving said carriage.

11. Cinematographic apparatus for sequentially recording on a single frame of photosensitive material a plurality of composite images of a photographic subject capable of being used to exhibit motion picture effects, including:

(a) a field lens;

(b) a lenticular plate with an array of lenticules in the optical path of light directed by the field lens for dissecting the image formed by said field lens and for focusing the dissected image upon a common image plane;

(c) opaque shield means adjacent said image plane and fixed with respect to said lenticular plate, said shield means having a pattern of minute spaced apertures therein, one for each of said lenticules, each of said apertures representing the image formed by its respective lenticule of a common effective aperture located a finite distance on the subject side of said lenticular plate, the pitch of said apertures being greater than the pitch of their respectively associated lenticules, whereby the image components admitted through said apertures to said image plane represent different portions of said photographic subject;

(d) means for supporting a photosensitive material at said image plane; and (e) means for effecting relative movement between the photosensitive material and said shield means in said image plane on a path effective to progressively expose through said apertures the unexposed area on said material to record a timed sequence of composite exposures of said photographic subject.

12. The appaartus defined by claim 11 wherein said lenticules on said lenticular plate and said apertures in said shield means are arranged in grid-like arrays on mutually perpendicular lines of predetermined pitch, the pitch of said array of apertures being greater than the pitch of said array of lenses.

13. The apparatus defined by claim 12 wherein said relative movement between the photosensitive material and the aperture means is rectilinear at an acute angle with respect to one set of parallel lines of apertures.

14. The apparatus defined by claim 13 wherein said means for effecting relative movement between the photosensitive material and said shield means include a reciprocably mounted carriage carrying said lenticular plate and means for moving said carriage.

15. For use with cineamotographic apparatus for sequentially recording on a single frame of photosensitive material a plurality of composite images capable of being used to exhibit motion picture effects, an optical system for forming a composite dissected image of a photographic subject, comprising:

(a) a lenticular plate comprising a regular array of lenticules for imaging a photographic subject at a common image plane; and (b) opaque shield means adjacent said image plane and fixed with respect to said lenticular plate, said shield means having a pattern of minute apertures therein, one for each of said lenticules, each of said apertures representing the image formed by its respectively associated lenticule of a common effective aperture located a finite distance on the subject side of said plate, the pitch of said apertures being greater than the pitch of their respectively associated lenticules, whereby the image components admitted through said apertures to said image plane represent different portions of said photographic subject.

References Cited

UNITED STATES PATENTS

| | | | |
|---|---|---|---|
| 525,439 | 9/1894 | Blackmore | 95—36 |
| 1,875,244 | 8/1932 | Keen | 95—36 X |
| 3,099,195 | 7/1963 | Goodbar | 95—37 |
| 3,267,826 | 8/1966 | Browning. | |

JOHN M. HORAN, Primary Examiner

UNITED STATES PATENT OFFICE
CERTIFICATE OF CORRECTION

Patent No. __3,459,111__   Dated __August 5, 1969__

Inventor(s) __Dexter P. Cooper, Jr.__

It is certified that error appears in the above-identified patent and that said Letters Patent are hereby corrected as shown below:

Column 3, line 32, (appln., page 5, line 11) "open" should be --opening--;

Column 3, line 34, (appln., page 5, line 13) after "having" delete "a";

Column 4, line 17, (appln., page 7, line 3) "aperture" should be --apertures--;

Column 5, line 39, (appln., page 9, line 24) after "plate-mask insert --unit--;

Column 6, line 24, (appln., page 11, line 14) "appaartus" should be --apparatus--;

Column 6, line 46, (appln., page 12, line 2) "shaft" should be --shift--;

Column 7, line 3, (appln., page 13, line 1) "twent-five" should be --twenty-five--;

Column 7, line 49, (appln., page 14, line 11) "fields" should be --field--;

Column 8, line 2, (appln., page 15, line 4) "day" should be --ray--;

Column 8, line 30, (appln., page 15, line 27) after "invention' insert --herein--;

CONTINUED ON PAGE 2

UNITED STATES PATENT OFFICE
CERTIFICATE OF CORRECTION

Patent No. 3,459,111     Dated August 5, 1969

Inventor(s) Dexter P. Cooper, Jr.     PAGE - 2

It is certified that error appears in the above-identified patent and that said Letters Patent are hereby corrected as shown below:

CONTINUED FROM PAGE 1

Column 9, line 5, (appln., claim 2, line 20) "photosentive" should be --photosensitive--;

Column 9, line 12, (appln., claim 2, line 27) "photograpsic" should be --photographic--;

Column 9, line 66, (appln., claim 9, line 3) "recitlinear" should be --rectilinear--;

Column 10, line 30, (appln., claim 12, line 1) "appaartus" should be --apparatus--;

Column 10, line 45, (appln., claim 10, line 1) "cineamotographic" should be --cinematographic--.

Signed and sealed this 14th day of March 1972.

(SEAL)
Attest:

EDWARD M. FLETCHER, JR.     ROBERT GOTTSCHALK
Attesting Officer     Commissioner of Patents